United States Patent
Bhudolia et al.

(10) Patent No.: US 12,331,613 B2
(45) Date of Patent: Jun. 17, 2025

(54) COMPOSITE DOWNHOLE TOOLS

(71) Applicant: Halliburton Energy Services, Inc., Houston, TX (US)

(72) Inventors: Somen Kumar Bhudolia, Singapore (SG); Michael Linley Fripp, Singapore (SG); Sandeep Thatathil, Singapore (SG); Arpana Singh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/493,471

(22) Filed: Oct. 24, 2023

(65) Prior Publication Data

US 2025/0129686 A1   Apr. 24, 2025

(51) Int. Cl.
*E21B 33/12* (2006.01)
*B29C 70/32* (2006.01)

(52) U.S. Cl.
CPC .......... *E21B 33/1208* (2013.01); *B29C 70/32* (2013.01)

(58) Field of Classification Search
CPC .............................. E21B 33/1208; B29C 70/32
See application file for complete search history.

(56) References Cited

U.S. PATENT DOCUMENTS

| | | | |
|---|---|---|---|
| 5,348,096 A | 9/1994 | Williams | |
| 6,233,374 B1 | 5/2001 | Ogle et al. | |
| 8,398,801 B2 | 3/2013 | Barlow et al. | |
| 8,800,605 B2 | 8/2014 | Barlow et al. | |
| 9,174,393 B2 | 11/2015 | Bartel et al. | |
| 10,480,280 B2 | 11/2019 | Hou et al. | |
| 10,605,044 B2 | 3/2020 | Davies et al. | |
| 11,529,781 B2 | 12/2022 | Al-Zubaidy et al. | |
| 2004/0216871 A1* | 11/2004 | Mendez | E21B 33/1277 166/187 |
| 2005/0109502 A1 | 5/2005 | Buc Slay et al. | |
| 2008/0260471 A1 | 10/2008 | Simmons et al. | |
| 2011/0308709 A1 | 12/2011 | Ouellette | |
| 2011/0309074 A1* | 12/2011 | Thunhorst | F17C 1/16 220/660 |
| 2014/0261847 A1 | 9/2014 | Molina | |
| 2015/0027720 A1 | 1/2015 | Spencer et al. | |

(Continued)

FOREIGN PATENT DOCUMENTS

| | | | |
|---|---|---|---|
| GB | 2275066 A * | 8/1994 | ......... E21B 33/1277 |
| WO | 98/38030 | 9/1998 | |
| WO | 1999062704 A1 | 12/1999 | |

OTHER PUBLICATIONS

Yi Di Boon;Sunil Chandrakant Joshi;Somen Kumar Bhudolia; (2021). Review: Filament Winding and Automated Fiber Placement with In Situ Consolidation for Fiber Reinforced Thermoplastic Polymer Composites . Polymers, (),-.

(Continued)

*Primary Examiner* — Kristyn A Hall
(74) *Attorney, Agent, or Firm* — Scott Richardson; C. Tumey Law Group PLLC

(57) ABSTRACT

A variety of methods and apparatus are disclosed, including, in one embodiment, an apparatus comprising a downhole tool for use in a borehole, the downhole tool comprising a composite of thermoplastic and fibers, wherein the fibers reinforce the thermoplastic, and wherein fiber placement gives the composite as favoring the hoop strength over the axial strength.

20 Claims, 9 Drawing Sheets

(56) References Cited

U.S. PATENT DOCUMENTS

| | | |
|---|---|---|
| 2016/0167319 A1 | 6/2016 | Sabo et al. |
| 2019/0162334 A1* | 5/2019 | Westhoff .............. F16L 11/083 |
| 2019/0264543 A1 | 8/2019 | Sherman |

OTHER PUBLICATIONS

Al Christopher C. de Leon;Ítalo G.M. da Silva;Katrina D. Pangilinan;Qiyi Chen;Eugene B. Caldona;Rigoberto C. Advincula; (2021). High performance polymers for oil and gas applications . Reactive and Functional Polymers, (),-.

Schillfahrt, Christian; Fauster, Ewald; Schledjewski, Ralf (2017). Influence of process pressures on filling behavior of tubular fabrics in bladder-assisted resin transfer molding. Advanced Manufacturing: Polymer & Composites Science, 3 (4), 148-158.

Gbadeyan, Oluwatoyin Joseph; Kanny, Krishnan; Mohan, Turup Pandurangan (2017). Tribological, mechanical, and microstructural of multiwalled carbon nanotubes/short carbon fiber epoxy composites. Journal of Tribology, (),-.

Poly Fluoro Ltd., Unravelling Polymers, The seven sides of PTFE, Apr. 16, 2011. Accessed Oct. 23, 2023. Available at https://polyfluoroltd.com/blog/the-seven-sides-of-ptfe-or-why-ptfe-is-way-cooler-than-most-realize/.

Xu, et al., Journal of Reinforced Plastics and Composites, Research on heated-mandrel winding process for resin-matrix composite shells, Apr. 20, 2012.

International Search Report and Written Opinion for International Patent Application No. PCT/US2023/079682 dated Jul. 17, 2024. PDF file. 10 pages.

\* cited by examiner

COMPOSITE DOWNHOLE TOOLS

BACKGROUND

Boreholes may be drilled into subterranean formations to recover valuable hydrocarbons, among other functions. Operations may be performed before, during, and after the borehole has been drilled to produce and continue the flow of the hydrocarbon fluids to the surface. Downhole tools in the borehole or wellbore may facilitate the production of the hydrocarbon fluids from the subterranean formation.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1A:
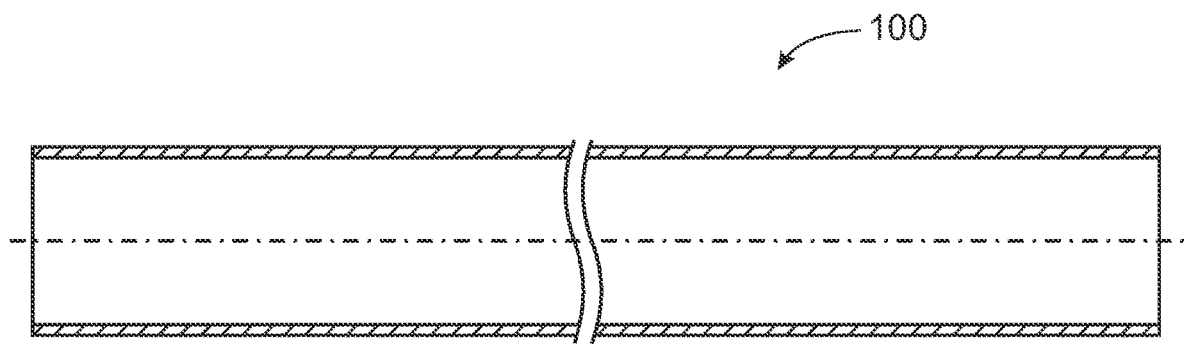
FIG. 1A is a cross-section view of an example of a mandrel for an example packer or packer assembly.

Some aspects of the present disclosure are directed to downhole equipment (e.g., downhole tool mandrels, downhole pressure housings, etc.) that are a composite of thermoplastic reinforced with fibers in which the fiber placement (orientation, winding angles) favors hoop strength over axial strength. Such can give increased collapse strength and increased burst strength compared to metallic counterparts of the downhole equipment. Other benefits for downhole tools of the present thermoplastic composites compared to conventionally utilized metals can include lower friction and less corrosion. Embodiments include a downhole tool constructed from a combination of composite components and steel components.

Disclosed herein as an alternative to metallic parts are filament-wound thermoplastic composites as a material solution and design technique to manufacture high-strength tool mandrels (e.g., for packers) and downhole pressure housings. Aspects include downhole tools (e.g., packer, pressure housing, etc.) and downhole tool components (e.g., tool mandrel, etc.) that are a composite of thermoplastic resin or matrix and fibers, and in which the fiber placement (e.g., via filament winding, etc.) favors hoop strength over axial strength. In implementations, the fiber placement (fiber orientation, winding angles) in the composite favoring hoop strength over axial strength means the composite is formed (e.g., via filament winding, etc.) with fiber winding angles that are beneficial for (or advance or increase) hoop strength without concern for axial strength. The fiber winding angle(s) are prioritized to give hoop strength over axial strength where there is a conflict between hoop strength and axial strength. A conflict between hoop strength and axial load is resolved by specifying a winding angle that increases hoop strength and decreases axial strength.

While the fiber placement is directed to hoop strength with little or no concern for axial strength, the numerical values for hoop strength may depend on the wall thickness and geometry of the particular tool mandrel or pressure housing. The value of hoop strength is generally influenced by the diameter to wall thickness ratio of the tube that is the tool mandrel or pressure housing, as well as related to the part geometry generally and material properties (fiber type, architecture, matrix type, etc.) in addition to the fiber placement or fiber orientation. In implementations for the composite (downhole tool mandrel or pressure housing), the hoop strength is greater than the axial strength.

The composite is subjected to primarily or solely hoop stress and little or no axial load. In application (e.g., in operation) in the borehole or wellbore, the composite tool mandrel or composite pressure housing is subjected to significantly more hoop stress (hoop pressure, hoop load) than axial load (tensile and compression stresses). In implementations, the downhole tool as or having the composite experiences and is configured for axial load (axial stress) less than 10% (e.g., in the range of 0% to 10%) of the hoop stress experienced.

The axial direction is the direction of the longitudinal axis. The axial strength is strength in the axial direction (direction of the longitudinal axis), and includes tension strength in the axial direction and compressive strength in the axial direction. The axial load (force, stress) experienced is load (force, stress) in the direction of the longitudinal axis, and includes tension load (force, stress) in the axial direction and compressive load (force, stress) in the axial direction.

In forming the composite, the fiber orientation may be applied (tailored) to increase hoop strength without concern generally of axial strength other than, for example, a specified minimum for axial strength. The hoop strength may generally encompass burst strength and collapse strength. The application can be for downhole tool components that are subjected to little or no axial load. Again, the fiber orientation in making the composite material favors hoop strength over axial strength, and in which the downhole tool components as utilized downhole in a wellbore may experience a relatively small amount of axial load.

A tool mandrel that is a composite of thermoplastic and fibers may provide for less friction in operation of the downhole tool (e.g., packer) having the tool mandrel compared to if the tool mandrel were metal. In setting or actuating a packer in a wellbore, friction is experienced between the packer mandrel and the packer element. The surfaces that interface (contact, move) that experience friction may include, for instance, with the inside surface of the packer element (e.g., sealing element) that may move with respect to an outside surface of packer mandrel, and in which friction is experienced between the two surfaces. Other configurations that experience friction are applicable. The packer element may be a sealing element (e.g., elastomeric sealing element) that forms a seal, for example, between the packer and the inside diameter of the wellbore casing. Beneficially, the packer mandrel being a thermoplastic composite compared to metal may reduce the setting force of actuating or energizing the packer or packer element.

With respect to friction for a tool mandrel, examples of moving surfaces include sliding seals, hydraulic pistons, packer wedges, and packer elements. Further, in addition to friction that can be experienced between a packer mandrel and the packer element is friction between the packer mandrel and the wellbore casing. The latter could be a scenario in event the packer elements are damaged during setting and there is direct contact between the tool mandrel and the casing. A lower coefficient of friction of the packer mandrel can be beneficial to facilitate retrieval for maintenance purposes.

Downhole tools (or downhole tool components) that are a thermoplastic composite may provide for increased corrosion resistance (decreased corrosion) compared to conventional metallic downhole tools or epoxy composite (thermoset composite) downhole tools. In being subjected to downhole fluids that can have corrosive compounds, such as hydrogen sulfide, brines, acid (e.g., hydrochloric acid or HCl) including concentrated acids, and the like, the thermoplastic composites of the present techniques (downhole tools) may generally experience less corrosion than typical metals (and epoxy composites) utilized for downhole tools. Moreover, the present thermoplastic composites can generally provide higher strength than metal or epoxy composites.

Most downhole tools are constructed of metals, such as steel and superalloys. These metals are generally dense and have high friction, limited burst strength, limited collapse strength, and are prone to corrosion in presence of downhole fluids (especially compounds such as hydrogen sulfide). In scenarios in which metals have adequate burst and collapse strength, the metals, as indicated, have less corrosion resistance and a higher coefficient of friction than thermoplastic composites. Moreover, the thermoplastic composites herein with different fiber combinations/orientations and thermoplastic resins can be employed with (configured for) little or no axial load on the component.

Metal mandrels of downhole tools (e.g., a packer) have high friction with components or elements (e.g., the packer element) of the downhole tool and thus the downhole tool having the metal mandrel can require significant setting force. Epoxy composites can also have higher friction and greater corrosion than thermoplastic composites.

As indicated, embodiments herein utilize fiber-wound thermoplastic composites to give high-strength tool mandrels that provide for lower friction. The lower friction can reduce force to set downhole tool components (e.g., the packer element). Further, embodiments herein of downhole equipment (e.g., downhole tool mandrels and downhole pressure housings) constructed of fiber-wound thermoplastic composites with fibers oriented to favor hoop strength may have a higher collapse strength and better corrosion resistance than steel and high-chrome alloys (as well as epoxy composites) for downhole tools. The fiber-wound thermoplastic composites of the present techniques can provide for higher burst and collapse strength and improved corrosion resistance, which can be beneficial for downhole tools (including for tool mandrels), tubulars, pressure housings, and so on. In implementations herein, the tool mandrel or pressure housing, for example, may be constructed from a high-strength low-friction composite having thermoplastic and reinforcement material (fibers).

The thermoplastic as a high-temperature and corrosion resistant matrix material may be, for example, polyether ether ketone (PEEK), polyether ketone ketone (PEKK), and other high-temperature thermoplastics. The reinforcement material (e.g., fibers, particles, etc.) may be, for instance, carbon, glass, and/or aramid, and other materials. Moreover, as mentioned, an aspect can be applying the material to components that experience little axial load, and therefore the fiber orientation is optimized for (or to benefit) increased hoop strength while accepting loss of axial strength (without worrying significantly about losing axial strength other than satisfying any specified minimum).

The downhole tool (e.g., pressure housing) or composite component (e.g., mandrel) of the downhole tool (e.g., packer) can include thick and thin ply fiber reinforcement with different winding patterns in the thickness direction and/or in the axial (longitudinal) direction to optimize or benefit mechanical properties. Varying the ply orientation can facilitate (provide, allow) providing, for example, a layup (e.g., I-beam style layup) with increased buckling and collapse strength while also preserving axial load capability.

Embodiments herein include low-friction, high-temperature and high-strength thermoplastic composite mandrels (or pressure housing) that are generally not under significant axial loading and are under (e.g., only under) pressure loadings (burst and/or collapse). In contrast, conventional composite frac plugs are typically under considerable axial (tensile/compression) loading.

Implementations herein can utilize thick ply fibers and thin ply fibers for the thermoplastic composite for downhole tool components or downhole pressure housings. The thick ply fibers are generally at least 150 grams per square meter (gsm), such as in the range of 150 gsm to 300 gsm. The thin ply fibers are typically less than 150 gsm, or in the range of 25 gsm to 150 gsm. The fibers can be, for example, carbon fibers, glass fibers, aramid fibers, ceramic fibers, and/or other types of fibers. In implementations, the fibers may be reinforcement in a prepreg form (pre-impregnated with a high temperature thermoplastic matrix like PEEK, PEKK, polyetherimide (PEI), and others.

Challenges exist with metallic mandrels of packers and with metal pressure housings. For instance, metal mandrels and pressure housing may crush under hoop stress or pressure loadings. Implementations of the composite downhole components having fiber orientation favoring hoop strength can better withstand such hoops stress and pressure loadings.

Metallic packers are generally significantly heavier than thermoplastic composite materials having high strength and lower friction. Moreover, as mentioned, implementations of the thermoplastic composite can lead to reduced setting force for the downhole tool (e.g., packer) and withstand high burst and collapse strength. The present fully non-metallic composite may reduce total cost of ownership compared to metallic tools. Furthermore, embodiments of the present thermoplastic composite are generally a nondegradable composite downhole. This is in contrast, for example, to degradable frac plugs and epoxy composite frac plugs, both of which degrade in hot brine and in hot acid. Implementations of the present thermoplastic composite as a material of a downhole tool mandrel or pressure housing are nondegradable, which means the thermoplastic composite retains greater than 90% of its original strength after exposure to water at 100° C. for 30 days or after exposure to 15% HCl (15% by volume or weight) at 100° C. for 3 days.

Figure 1B:
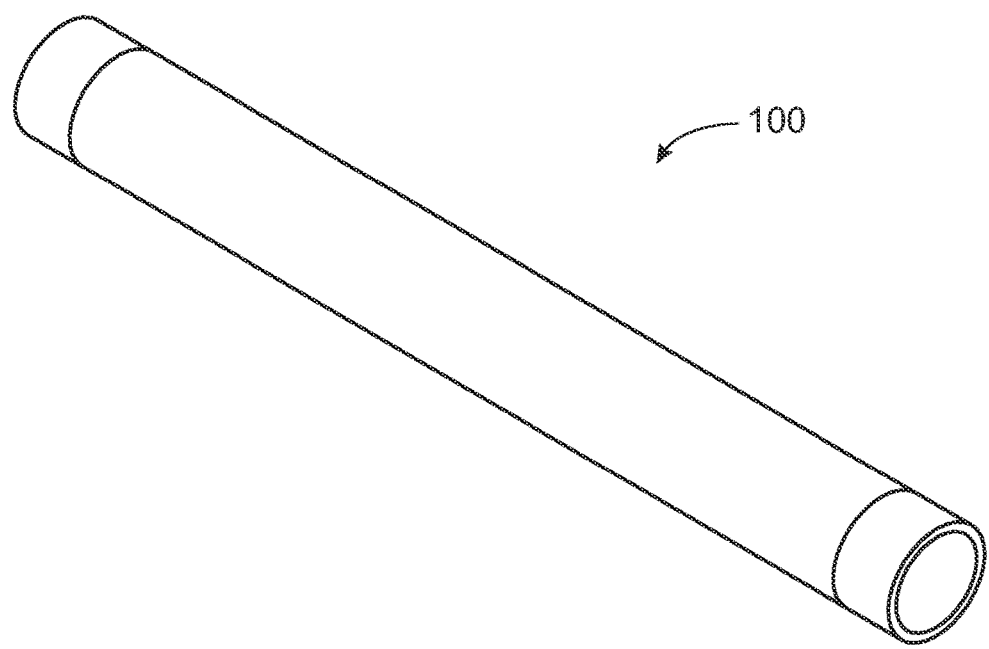
FIG. 1B is a perspective view of the mandrel of FIG. 1A.

FIG. 1A is a cross-section view of an example of a mandrel 100 for an example packer or packer assembly. FIG. 1B is a perspective view of the mandrel 100. In this example, the mandrel 100 is a flow tube in the packer assembly. For the packer installed downhole, the packer will experience (be under, be subjected to) little or no axial load, and will be under primarily (e.g., only) burst pressure (internal pressure) and/or collapse pressure (external pressure or internal vacuum). Under such conditions, metallic mandrels are generally more likely to fail than implementations herein of composite mandrels having the specified (implemented) fiber orientation to favor hoop strength.

The mandrel 100 is a composite of thermoplastic and fibers, as discussed. The fibers (e.g., carbon fibers, glass fibers, aramid fibers, boron fibers, etc.) are filler or reinforcement material that reinforces the thermoplastic resin (e.g., PEEK, PEKK, PEI, etc.) that is the matrix or binder in the composite. The fibers are oriented for pressure or hoop strength rather than for tension because the mandrel 100 in operation will be under primarily burst pressure and collapse pressure, and under little or no axial load.

The mandrel 100 is depicted generally tubular in form but other example mandrels of the described composite can have more complex tubular profiles. Further, mandrels for downhole tools other than plugs can have the discussed composite having a fiber orientation for pressure (hoop load or hoop strength) rather than for axial load or axial strength. Moreover, pressure housings (which can be generally tubular or cylindrical in form) can be a thermoplastic composite so configured.

Embodiments include a thermoplastic composite mandrel that can be fully non-metallic or a thermoplastic composite with a metal liner. In implementations, to form the thermoplastic composite, fibers pre-impregnated with thermoplastic resin can be wrapped on the metal liner. In implementations, the liner can be a thermoplastic composite.

To form the thermoplastic composite mandrel (or downhole pressure housing), the usage of anisotropic composites allows the combination of different layers of fibers to optimize or increase desired mechanical properties. Different fiber types like carbon fibers, glass fibers, aramid fibers (Kevlar®), boron fibers, metal fibers, thermoplastic fibers, and others can be utilized to selectively alter the material response along the length (axial direction, longitudinal direction) and in through the thickness direction (radial direction).

To counter the setting and operational forces downhole, the fiber reinforcement layers should have directional orientations. In one variation, the fibers are oriented in the hoop direction to increase or maximize the collapse resistance. This favors hoop strength over axial strength. In one variation, the thermoplastic composite mandrel (or thermoplastic downhole pressure housing) is manufacture having antisymmetric $\pm\phi$ angle-ply laminates (where $\phi$ is winding angle) as opposed to fully symmetric laminates. Antisymmetric laminates can create cross-coupling which has increased or maximum bending strength but little or no (zero) coupling coefficients. With thin ply laminates, the fiber layers are more finely dispersed and form stronger laminate. With thin ply laminates, there is more play to increase, manipulate, or optimize the strength of the composite and to effectively utilize the anisotropy of unbalanced laminates to take advantage of coupling between the different mode classes (bending, distortional, local, torsion, axi-symmetric, extension). This can favor hoop strength over axial strength. In another variation, winding angles as discussed with respect to FIG. 2 are implemented to favor hoop strength over axial strength.

Figure 2:
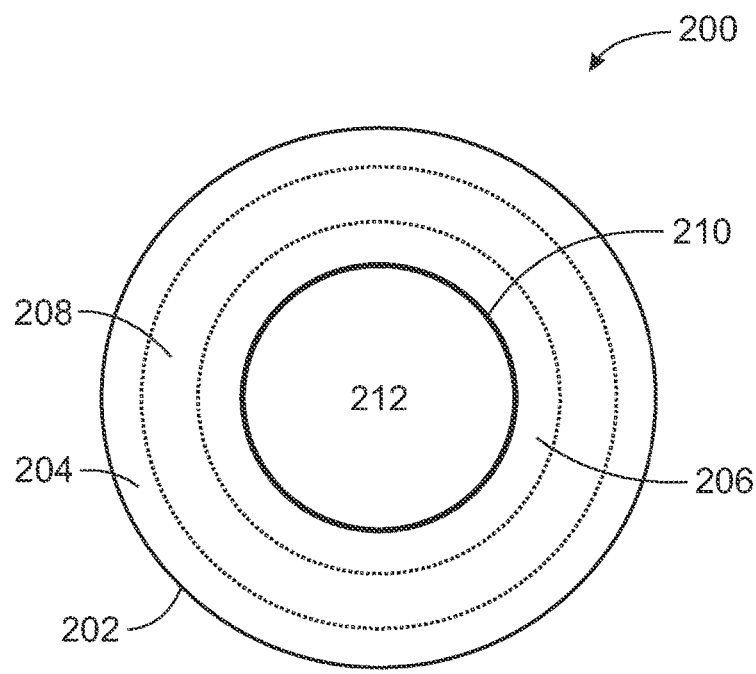
FIG. 2 is a simplified longitudinal end view of a packer mandrel that is a composite of thermoplastic and fibers.

FIG. 2 is a simplified longitudinal end view of a packer mandrel 200 (or pressure housing) that is a composite of thermoplastic and fibers, as discussed, and in which the winding angle of the fibers is varied in the thickness (radial) direction to provide for favoring hoop strength over axial strength. The fibers (e.g., carbon fibers, glass fibers, aramid fibers, boron fibers, etc.) reinforce the thermoplastic (e.g., PEEK, PEKK, PEI, etc.). The exterior (outer) surface of the mandrel 200 is denoted by the reference numeral 202. In the illustrated implementation, the outer layers 204 (outer radial portion) of the mandrel 200 are wound with winding angles in the range of 80° to 90° ($\pm 80° < \phi \leq \pm 90°$) to counter the higher axial and radial compressive forces. Winding angles have positive and negative values, defined by counterclockwise and clockwise rotation based on axial direction. The inner layers 206 (inner radial portion) of the mandrel 200 are wound with winding angles in the range of 35° to 60° ($\pm 35° < \phi \leq \pm 60°$). The middle layers 208 (middle radial portion) of the mandrel 200 are wound with combination of winding angles in the range of 80° to 90° ($\pm 80° < \phi \leq \pm 90°$) and winding angles in the range of 35° to 60° ($\pm 35° < \phi \leq \pm 60°$). The number of layers of each winding angle may generally be dependent on the target thickness of the composite mandrel 200. These respective winding angles for the outer layers 204, inner layers 206, and middle layers 208 give the packer mandrel 200 as a thermoplastic composite in which the fiber orientation favors hoop strength over axial strength.

The packer mandrel 200 can optionally have an inner liner 210 at the inner radial surface of the mandrel 200 that defines the interior void space 212 of the mandrel 200. The inner liner 210 (if employed) can be metallic, thermoplastic, or fluoropolymer, and the like. For the option of no inner liner 210, the first inner layer of the fully composite mandrel 200 (tube) can supplant the liner or act as a liner.

Lastly, the same configuration of winding angles for the packer mandrel 200 can be applied to give a downhole pressure housing as a thermoplastic composite having a fiber orientation that favors hoop strength over axial strength.

Figure 3A:
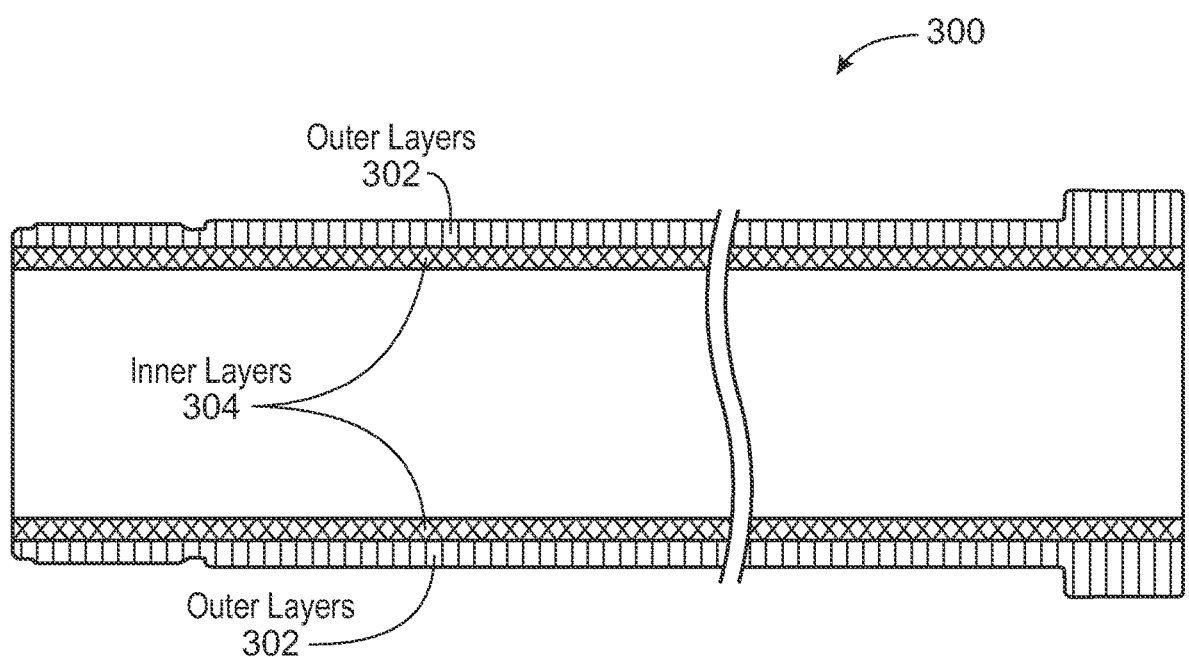
FIG. 3A and FIG. 3B are diagrams of a packer mandrel.
Figure 3B:
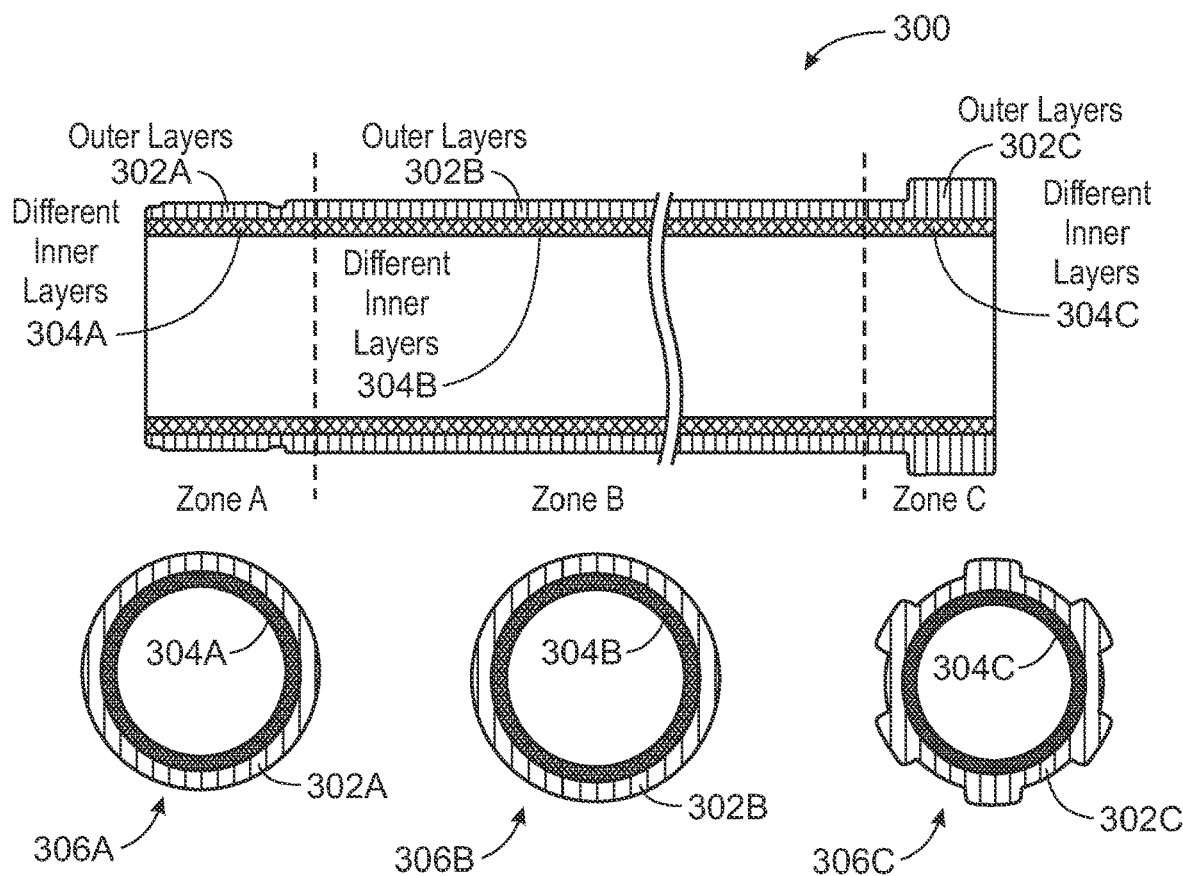

FIG. 3A and FIG. 3B are a packer mandrel 300. Different winding configurations for the fiber orientation system are indicated. FIG. 3A is for the mandrel 300 with the outer layers having a different fiber orientation (winding angles) than the inner layers, and thus varies in-through the thickness (radial) direction. FIG. 3B is for the mandrel 300 having the fiber orientation (winding angles) that varies in-through the thickness (radial) direction as well as along the longitudinal direction.

FIG. 3A is a cross-sectional view of the packer mandrel 300 that is a composite of thermoplastic and fibers, as discussed. The fibers (e.g., carbon fibers, glass fibers, aramid fibers, boron fibers, etc.) reinforce the thermoplastic (e.g., PEEK, PEKK, PEI, etc.). The fiber orientation (placement) is varied via the winding angle of the filament-wound thermoplastic composite in the thickness (radial) direction to give the composite mandrel 300 favoring hoop strength over axial strength. The fiber orientation (winding angle) of the outer layers 302 of the composite mandrel 300 is different than the fiber orientation (winding angle) of the inner layers 304 of the composite mandrel 300.

FIG. 3B is the packer mandrel 300 of FIG. 3A, except with indication that the winding angles can be varied not only in the thickness (radial) direction but also in the axial (longitudinal) direction to achieve selective strengthening. For example (in the illustrated implementation), in the section (zone A) of the mandrel 300 with threads where there is more strain and toughness constraints, different fiber types and fiber orientations can be utilized.

Different fiber orientations (winding angles) can be implemented at different locations of the mandrel 300 in thickness and/or longitudinal direction to balance strength, toughness, and cost, and to favor hoop strength over axial strength. The thin ply fibers that can provide for higher strength and modulus (than thick ply fibers) can be fully or selectively utilized in the filament-wound thermoplastic composite mandrel 300.

In the example of FIG. 3B, as depicted, there are three zones along the longitudinal axis of the mandrel 300: (a) zone A having outer layers 302A and inner layers 304A; (b) zone B having outer layers 302B and inner layers 304B; and (c) zone C having outer layers 302C and inner layers 304C. Longitudinal end-view cross sections 306A, 306B, and 306C are given for zone A, zone B, and zone C, respectively. The fiber orientation (winding angle) of two or more of the six segments of (1) the outer layers 302A, (2) the outer layers 302B, (3) the outer layers 302C, (4) the inner layers 304A, (5) the inner layers 304B, and (6) the inner layers 304C can be different with respect to each other to favor hoop strength over axial strength. The fiber type (e.g., ply, material, etc.) can also be varied among those six segments to favor hoop strength over axial strength.

Figure 4:
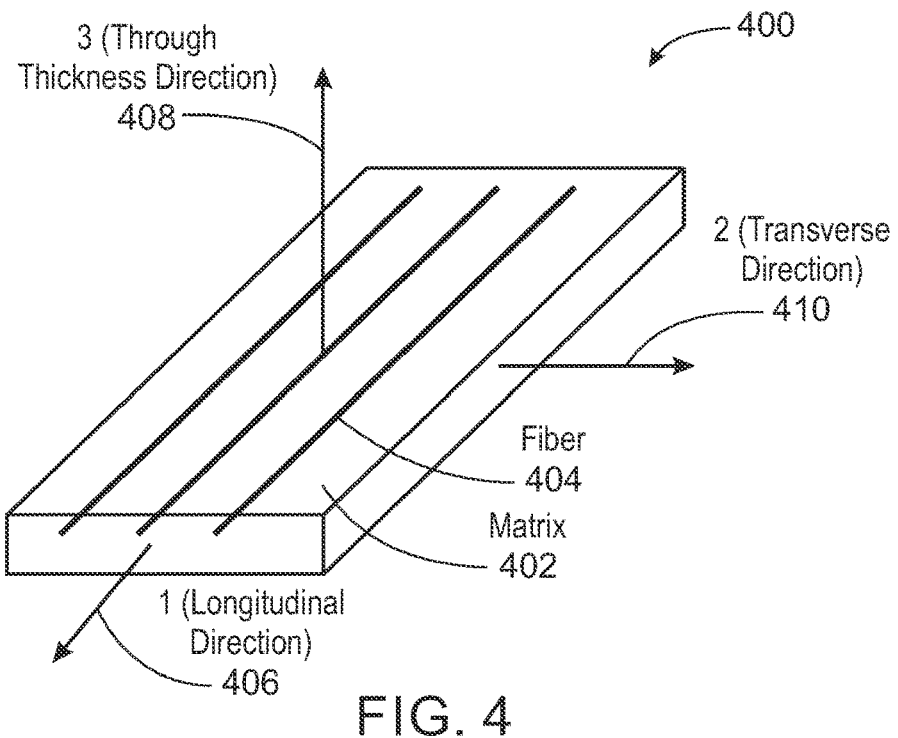
FIG. 4 is a diagrammatical representation indicating a fiber orientation system of composites of a thermoplastic matrix reinforced with fibers.

FIG. 4 is a diagrammatical representation 400 indicating a fiber orientation system of composites of a thermoplastic matrix 402 reinforced with fibers 404. The winding of the fibers 404 can be, for example, along the longitudinal direction 406. The winding angle can be varied in the longitudinal direction 406, through the thickness direction 408, and/or in the transverse direction 410.

As for composite materials, the reinforcement material to manufacture the thermoplastic composite mandrel (or thermoplastic composite downhole pressure housing) can be high-strength carbon, glass, boron, aramid fibers (e.g., Kevlar®), etc., or any combinations of these reinforcements. Thermoplastic prepregs can have continuous fibers (e.g., woven, non-woven, knitted, stitched, braided, wound, etc.), and the thermoplastic prepreg being in the form of sheets, tapes [e.g., FIG. 5 (a)], or towpregs. These thermoplastic prepregs can be appealing because they are manufactured with thermoplastic matrix pre-impregnating the fibers to give the prepreg. An alternative is to wet the fiber with a thermoplastic resin to achieve a relatively low void content.

The material combination (fiber/thermoplastic) for the thermoplastic composite may be, for example, carbon/PEEK, carbon/PEKK, and carbon/PEI. However, other combinations of different thermoplastic matrices and different fibers are applicable (and hybrid tapes can also be utilized with the combinations giving different fiber-matrix tapes). Further, comingled fibers [e.g., FIG. 5 (b)] that can be an intermingling of thermoplastic fibers and/or thermoplastic yarns with reinforcement fibers, and in which the intermingling can lead to more uniform fiber volume content in the manufactured thermoplastic composite mandrel for the downhole tool (e.g., packer or packer assembly) or in the manufactured downhole thermoplastic composite as a pressure housing.

Figure 5:
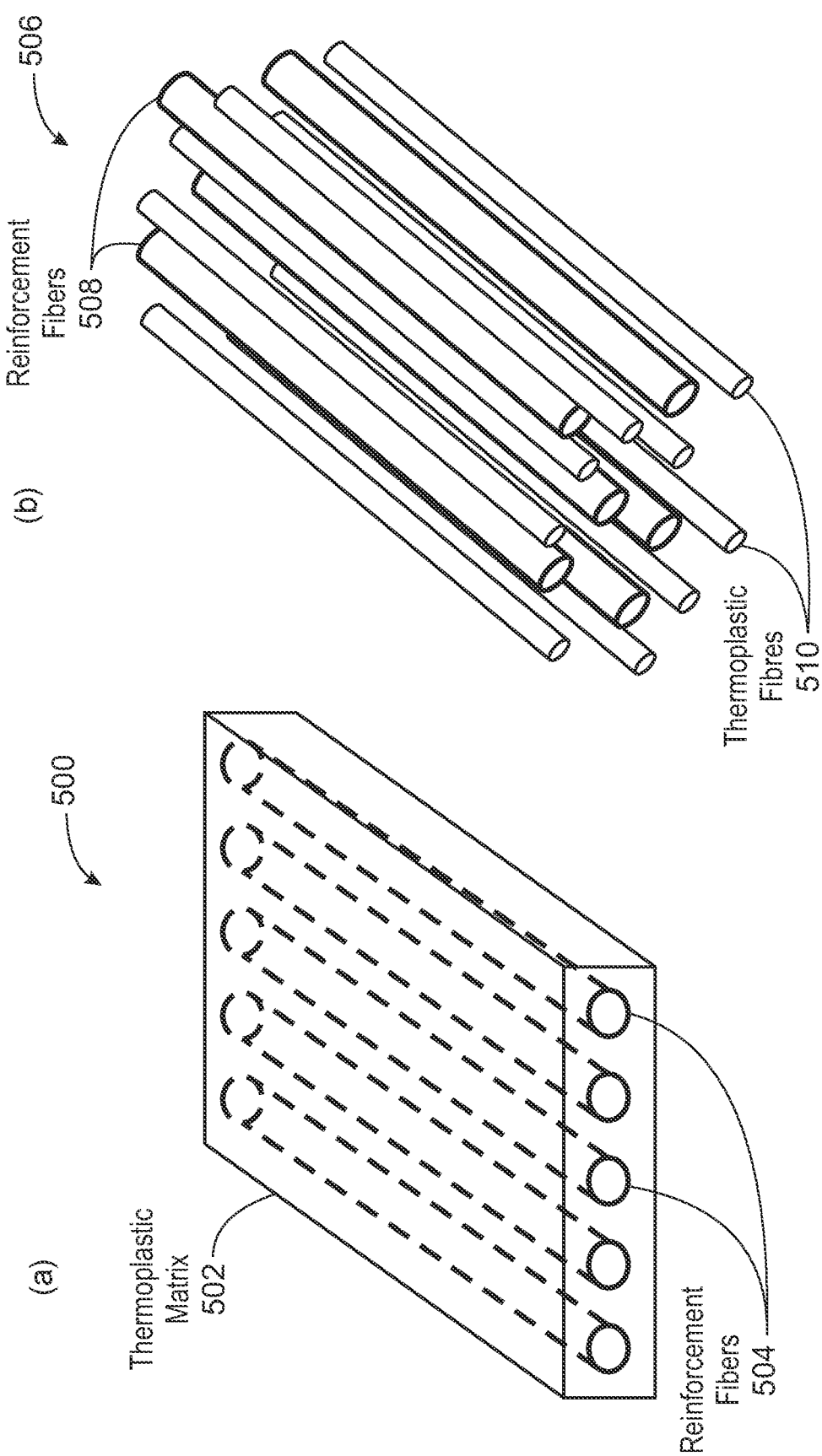
FIG. 5 is a diagram of a thermoplastic prepreg and a diagram of a representation of comingled fibers.

FIG. 5 (a) depicts a thermoplastic prepreg that is in the form of a thermoplastic prepreg tape 500 that is a composite of a thermoplastic matrix 502 and reinforcement fibers 504. In this example, the reinforcement fibers 504 may be characterized as being pre-impregnated or impregnated with the thermoplastic matrix 502 to give the thermoplastic prepreg tape 500. The fibers 504 reinforce the thermoplastic matric 502. The thermoplastic prepreg tape 500 (and other thermoplastic prepregs) can be utilized to form (manufacture) a thermoplastic composite mandrel for a downhole tool (e.g., packer) or to form (manufacture) thermoplastic composite pressure housing.

FIG. 5 (b) gives a representation of comingled fibers 506 having reinforcement fibers 508 (e.g., carbon fibers, glass fibers, aramid fibers, boron fibers, etc.) and thermoplastic fibers 510. Some or all the thermoplastic fibers 510 can be in the form of thermoplastic yarns. The comingled fibers 506 can be characterized as an intermingling combination of the reinforcement fibers 508 and the thermoplastic fibers 510. The comingled fibers 506 can be utilized to reinforce a thermoplastic resin (polymer) matrix or binder to give a composite of the thermoplastic (e.g., PEEK, PEKK, PEI, etc.) and the comingled fibers 506. The thermoplastic composite can be, for example, a downhole tool mandrel or a downhole pressure housing. The thermoplastic composite can be utilized to form (manufacture) a thermoplastic composite mandrel for a downhole tool (e.g., packer) or to form a thermoplastic composite pressure housing.

If a base or liner is employed, the base or liner can be metallic (e.g., steel, titanium, superalloys, etc.), a thermoplastic (e.g., PEEK, polyaryl ether ketone (PAEK), etc.), or a fluoropolymer (e.g., polytetrafluoroethylene (PTFE) or polyvinylidene fluoride (PVDF), both of which can be considered a thermoplastic). The base or liner can have a lower softening temperature compared to the thermoplastic base resin/matrix material used to manufacture the composite.

The thermoplastic utilized as the resin (matrix, binder) for the thermoplastic composite (for the downhole tool mandrel or pressure housing) can be or include polymers such as PEEK, PEKK, PTFE, PEI, polyaryl ether ketone (PAEK), polyurethane, high-temperature polyimide [thermoplastic polyimide (TPI)] (and/or other high-temperature thermoplastics), acrylonitrile butadiene styrene (ABS), polyamide, polyphenylene sulfide (PPS), polyethylene, polycarbonate, polyvinyl chloride (PVC), nylon and others. If nylon is employed, the nylon can be, for example, Nylon 6 or other nylons. Nylon 6, also known as polyamide (PA6), nylon PA6, or polycaprolactam, is generally synthesized by ring-opening polymerization of caprolactam and can have a melting point of 223° C. The thermoplastic binder may also be a thermoplastic elastomer, such as thermoplastic polyurethane or a thermoplastic polyamide. Properties of some of the high temperature thermoplastics used as the resin matrices of thermoplastic composites are presented in Table 1.

The fibers as reinforcement material in the composite can include carbon (e.g., high strength, high modulus, and others), glass (e.g., E-glass, S-glass, and others), aramid (e.g., Kevlar®), high-temperature thermoplastic (e.g., nylon PA6), boron, basalt, metal, polyethylene, polypropylene, poly (p-phenylene-2,6-benzobisoxazole) (PBO) (Zylon®), and others. In implementations, a liner is not employed and thus the mandrel or pressure housing may be a fully non-metallic thermoplastic composite. As indicated, if a liner is employed, the liner may be, for example, metallic (e.g., steel, titanium, superalloys, etc.), a thermoplastic (e.g., PEEK, PAEK, nylon/polyamide 12, etc.), or a fluoropolymer (e.g., PTFE, PVDF, etc.).

Table 1 gives properties of some of the high temperature thermoplastics that can be used as the resin matrix of the present thermoplastic fiber-reinforced composites herein. The $T_g$ is the glass transition temperature. The $T_m$ is the melt temperature. The $T_p$ is a typical processing temperature. The numerical values given in Table 1 are given only as examples and not meant to limit the present techniques.

TABLE 1

Properties of high temperature thermoplastics as resin matrices of composites

| Polymer | $T_g$ | $T_m$ | $T_p$ |
|---|---|---|---|
| PEI | 423° F./217° C. | NA | 630° F./332° C. |
| PEEK | 318° F./159° C. | 639° F./337° C. | 716° F./380° C. |
| PAEK | 296° F./147° C. | 581° F./305° C. | 640° F./338° C. |
| PEKK | 290° F./143° C. | 649° F./343° C. | 734° F./390° C. |

As for composite manufacturing techniques (systems, processes), the manufacturing technique to manufacture the composite mandrel (or composite pressure housing) may depend on the material systems discussed. The manufacturing techniques may include, for example, automated filament winding or bladder molding. Other applicable manufacturing techniques include, for instance, tape placement, autoclave molding, and so on, to manufacture the composite as the tubular mandrel profile or the tubular pressure housing profile.

Filament winding is conventionally a manufacturing technique to produce a hollow composite where the continuous fibers are passed through separate combs into an epoxy resin bath and guided around the rotating mandrel. However, embodiments herein of the filament winding utilize a thermoplastic rather than an epoxy as the binder. Thermoplastic prepreg tapes or fiber yarns may be filament wound around a rotating mandrel guided by a carriage. A 2-axis filament winding can manufacture a constant cross-section mandrel while a mandrel with complex geometry with variable cross sections and curvatures can also be manufactured with a filament winding robot with more degree of freedoms. Filament winding is typically a continuous process, and the tapes or fiber yarns are tensioned throughout by the tensioner units. The fibers wound on the mandrel can be in-situ consolidated via a heat source and in which a compaction roller can be employed to apply pressure and provide uniform impregnation, curing, thickness and fiber volume fraction control (e.g., see FIG. 6). The heat source used for in-situ consolidation can be, for example, a conduction heater, convection heater, ultrasonic heater, infrared heater, eddy current heater, laser, and so on. The conventional consolidation routes can also be adopted if in-situ consolidation is not chosen and the part can be thermally consolidated in an oven or autoclave, or infrared, microwave radiations, and allied processes can be used to consolidate the filament wound part. The fibers can be selectively wound in particular orientations to optimize or benefit the mandrel performance under a particular loading scenario.

"Prepreg" is a common term for a reinforcing fabric which has been pre-impregnated with a resin system. A prepreg may mean "fiber pre-impregnated with resin." Prepregs can be utilized to form (manufacture) composites (e.g., structural composites) including those with a fiber orientations and/or winding angles that favor hoop stress over axial stress. A prepreg is generally fiber material (e.g., woven or unidirectional fibers) impregnated with matrix material (e.g., a resin). The prepreg is typically formed before application to manufacture a product with the prepreg. Therefore, impregnated fibers in the prepreg (e.g., formed well before application of the prepreg) may be called pre-impregnated. Thermoplastic is applicable as the resin (matrix) for the prepreg and in which the prepreg may be labeled as a thermoplastic prepreg. As discussed, prepregs have fibers (e.g., woven, non-woven, knitted, stitched, braided, wound, etc.) and can be in the form, for example, of sheets or tapes, or other forms. In implementations, the fibers may generally be continuous fibers. The prepreg (e.g., in form of sheets or tapes) may be unidirectional fibers (most or all fibers running the same direction) impregnated with a resin matrix. Filament winding may be employed to form composite structures from the prepreg.

A towpreg (also called tow prepreg) is a form of prepreg (e.g., generally having continuous fibers). Towpreg is tows of fiber pre-impregnated with resin. Towpreg is commonly utilized in filament winding applications, and can be utilized to form a composite structure that favors hoop strength over axial strength. Towpreg material can be essentially a continuous prepreg composite and can have a relatively high filament count. Towpreg winding may utilize a fiber tow that is pre-impregnated with resin (prepreg). For unidirectional tape, individual tows may aligned and then spread to form an impregnated unidirectional tape. For woven, individual tows may woven together to form a fabric before impregnation. For non-woven, tows may be arranged in a non-woven mat before impregnation.

As indicated, filament winding is a composite manufacturing technique that can involve applying filament tows (e.g., glass fibers, carbon fibers, etc.) onto a mandrel. The filament layers may be cross plied to achieve the strength characteristics determined by the part designer. The applied tows can be combined with a resin matrix immediately prior to application to the mandrel (wet winding) or the tows can be a prepreg or towpreg which is the fiber/resin combination typically made well before application.

Implementations may form a composite structure (e.g., a fully composite structure) with no liner, or a hybrid composite structure (composite structure with metallic liner). The metallic liners (e.g., if employed as coupled to the composite structure) can be, for example, steel, titanium, alloys (e.g., superalloys), or other metals.

Different manufacturing techniques can be utilized to make the thermoplastic composite to give a fiber orientation or fiber winding angles that increase hoop strength while allowing for sacrifice of axial strength in implementations. The thermoplastic composite (e.g., as generally a hollow profile) can be formed, for example, by filament winding or bladder molding. The composite formed as a hollow profile can be a tubular, pressure housing, or a component (e.g., mandrel) for a downhole tool (e.g., packer), and so on. An example manufacturing technique that can be utilized to make the tubular-like profiles (e.g., pressure housing, tool mandrel, etc.) is filament winding. Other manufacturing techniques, such as tape placement or bladder molding, can also be employed to manufacture the thermoplastic composite pressure housing or the thermoplastic composite mandrel for a packer, and in which the formed structure favors hoops strength over axial strength.

For tape placement, a tape (e.g., a single tape) may passed through the feed rollers with a predefined tension and feed rate. The tape placement for composites (e.g., thermoplastic composites) may involve heating, melting, and cooling. An incoming composite tape may be bonded to a previously laid and consolidated laminate under heat and pressure locally applied to the interface. By laying additional layers in different directions, a part with desired thickness and properties can be fabricated. An example of tape placement is automated tape placement (ATP) composite manufacturing. In examples, the fiber placement process automatically places multiple individual pre-impregnated tows onto a mandrel at relatively high speed, employing a numerically controlled placement head to dispense, clamp, cut and restart each tow during placement. Tape laying is with prepregged tape, rather than single tows, laid down (e.g., continuously) to form parts.

Bladder molding is a manufacturing technique for composite parts (e.g., hollow composite parts). In bladder molding, a composite material may be applied to a bladder and the part inserted into a female cavity mold. A press may clamp the mold shut and heat applied to cure the part. Applied air pressure can force the laminate outward in the cavity, consolidating the material in the closed mold. The bladder may be removed after cure and the remaining end product is a hollow structure. The bladder molding may begin with fibers (e.g., sheets of fibers) impregnated with thermoplastic and that can be a prepreg. The prepreg sheets may be wrapped around an inflatable bladder, and then placed inside the mold cavity and the mold closed. Once the mold is closed, the mold may apply pressure to the inside of the bladder. Pressure may cause the bladder to expand and push on the resin-filled fibers. The pressure pushes outward against the inside of the mold cavity. Then, heat may be applied to the mold to solidify the part, or also known as curing. The component fibers form in the shape of the inside the mold cavity. Once cured, the mold may be opened, revealing the hardened hollow part, and the bladder may be removed from the inside.

Figure 6:
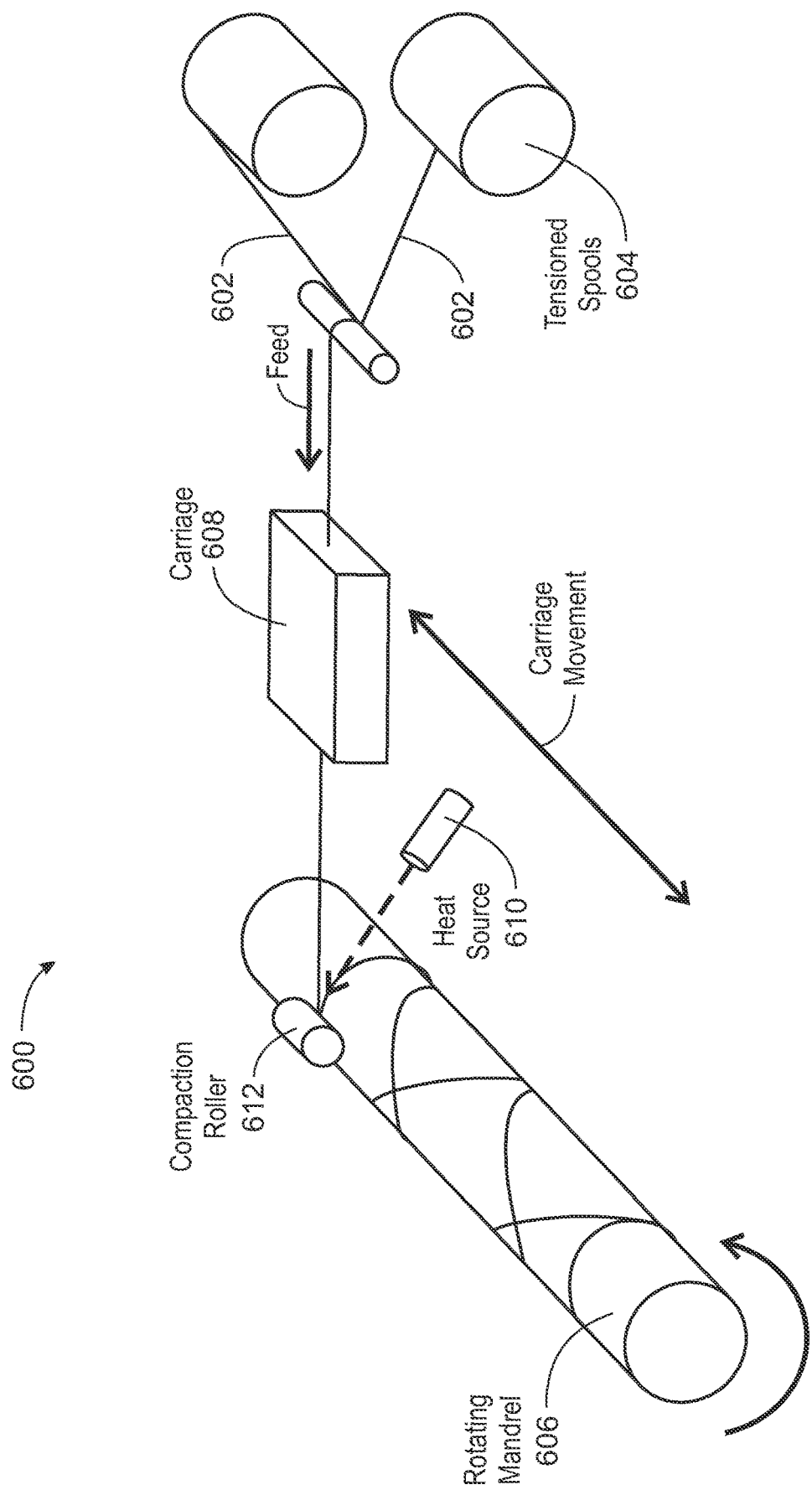
FIG. 6 is a diagram of a filament winding system.

FIG. 6 is a filament winding system 600. Filament winding can be employed to manufacture the thermoplastic composite packer mandrel (or downhole pressure housing) with, for example, prepreg tapes or towpregs. The fiber angles can be varied to produce tailored laminates to meet a range of loads requirement for a particular product. In embodiments, the product of the filament winding may be a product (packer mandrel or pressure housing) in which the fiber winding angles give the composite product as favoring hoop strength over axial strength.

The feed 602 can include fibers impregnated with thermoplastic resin, such as in the form of prepreg tapes or towpregs. As discussed, the fibers can include, for example, glass fibers, carbon fibers, aromatic polyamide fibers (e.g., Kevlar® fibers), and/or other fibers. The feed 602 (thermoplastic-impregnated fibers) can be fed, for example, from tensioned spools 604. The thermoplastic-impregnated fibers can be wound on a rotating metallic mandrel 606 to manufacture a thermoplastic composite (fiber-reinforced) as a hollow profile that is, for example, a packer mandrel or downhole pressure housing. The filament winding system 600 may include a carriage 608 that facilitates guiding the winding in the forming of the thermoplastic composite hollow profile (e.g., packer mandrel or pressure housing) on the rotating mandrel 606. In examples, no additional pressure is typically implemented for compaction because of the tension maintained on the fibers/tapes during the filament winding. In implementations, the thermoplastic composite formed as the hollow profile on the mandrel 606 can be cured, for example, in an oven or autoclave, or similar equipment, after the winding is completed.

While conventional filament winding can be utilized, in-situ consolidation using a heat source 610 (e.g., conduction heater, convection heater, ultrasonic heater, infrared heater, eddy current heater, or laser) and a compaction roller 612 can also be relied on to apply heat and pressure, respectively. The heat source 610 may apply heat to the thermoplastic-impregnated fiber being wound onto the rotating mandrel 606. The compaction roller 612 may apply pressure to the thermoplastic-impregnated fiber being wound onto the rotating mandrel 606. In implementations, this application of heat and pressure can provide for substantially uniform impregnation and facilitate more control of the fiber volume fraction. Thus, the filament winding system 600 may include heat source 610 and the compaction roller 612 that facilitate forming of the thermoplastic composite hollow profile on the rotating mandrel 606.

A hybrid metal-composite structure may be formed. For instance, a metal liner may be placed on the rotating mandrel 606 and the thermoplastic composite hollow profile formed on the cylindrical metal liner on the rotating mandrel 606.

On the other hand, a full composite tubular (no liner) can be made by demolding the composite hollow profile (tube) from the metallic mandrel 606. A release agent may be applied on the metal mandrel 606 or a low friction film [e.g., polytetrafluoroethylene (PTFE)] is first wrapped on the mandrel 606, and the thermoplastic impregnated fibers are wound over the release agent or low friction film on the rotating mandrel 606. This can facilitate an easier demolding.

Figure 7:
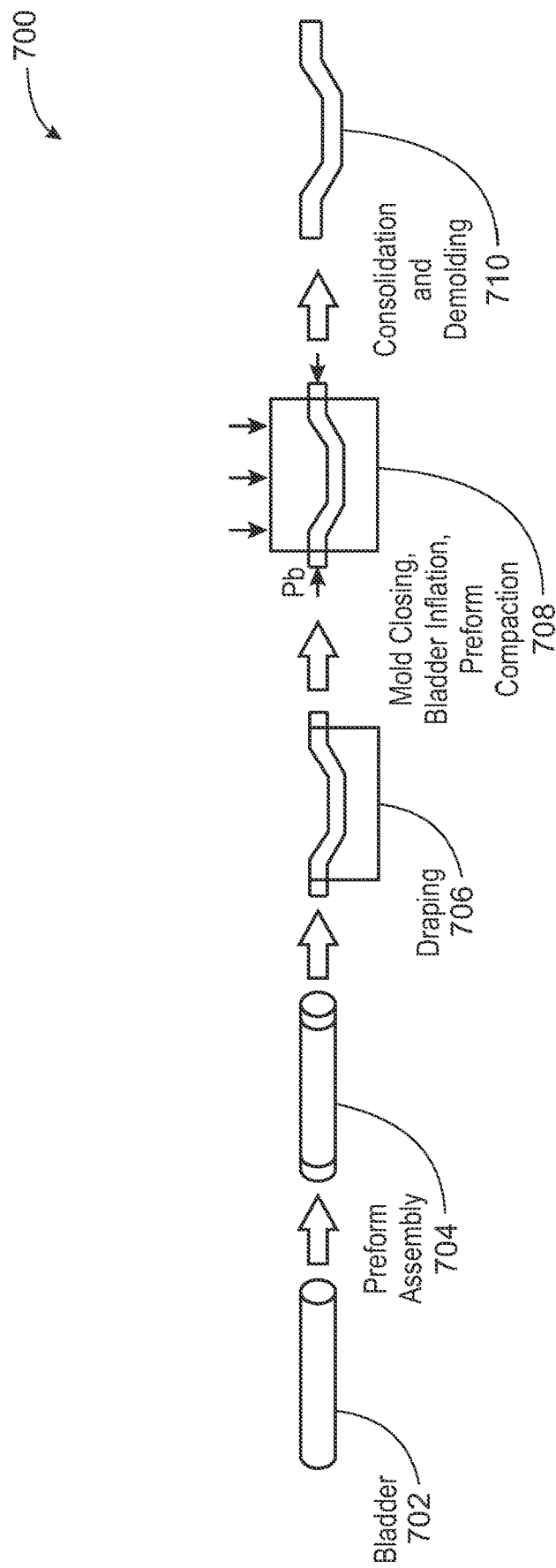
FIG. 7 is a diagram of a bladder molding technique.

FIG. 7 is a bladder molding technique 700 depicting a bladder 702, a preform assembly 704, draping 706, the actions 708 of mold closing, bladder inflation, and preform compaction, and the actions 710 of consolidation and demolding. As mentioned, a technique to manufacture the composite mandrel or composite pressure housing can be bladder molding. In bladder molding, the tubular-like preform can be made by wrapping a thermoplastic prepreg around the mandrel to achieve a desired layup of the fibers that gives, for example, increased hoop strength including with the option of sacrificing (decreasing) axial strength as desired to increase hoop strength as configured. This can be done by individually laying a fiber as specified orientation or winding angle around the mandrel or by making a preform of layers by placing the layers on top of each other and then wounding the entire preform around the mandrel to give the specified fiber orientation. This can be done manually or using an automated preforming device to achieve compaction. The preform can be removed from the mandrel and placed inside the mold cavity, and the inflatable bladder utilized to pressurize the preform (e.g., in the range of 6 bars absolute to 20 bars absolute) to drape the preform across the wall of the cavity and produce a hollow composite structure by heating the mold at the desired temperature based on the selection of the matrix material. This process can be adopted for complex tubular profiles. For a composite with a metallic or thermoplastic base/liner, the preform can be wound around the base/liner and the hybrid tubular can be placed in an autoclave or oven for consolidation.

Figure 8:
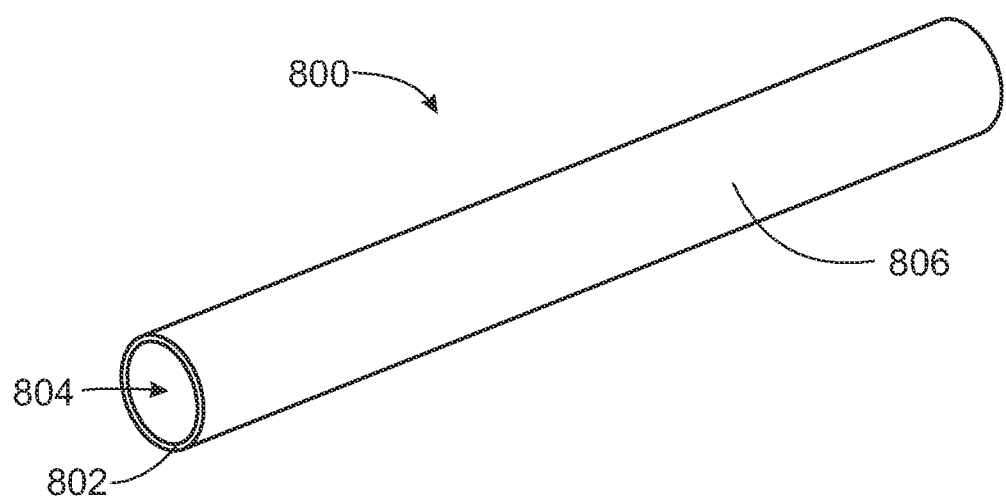
FIG. 8 is a diagram of a thermoplastic fiber-reinforced composite that is a hollow profile.
Figure 10:
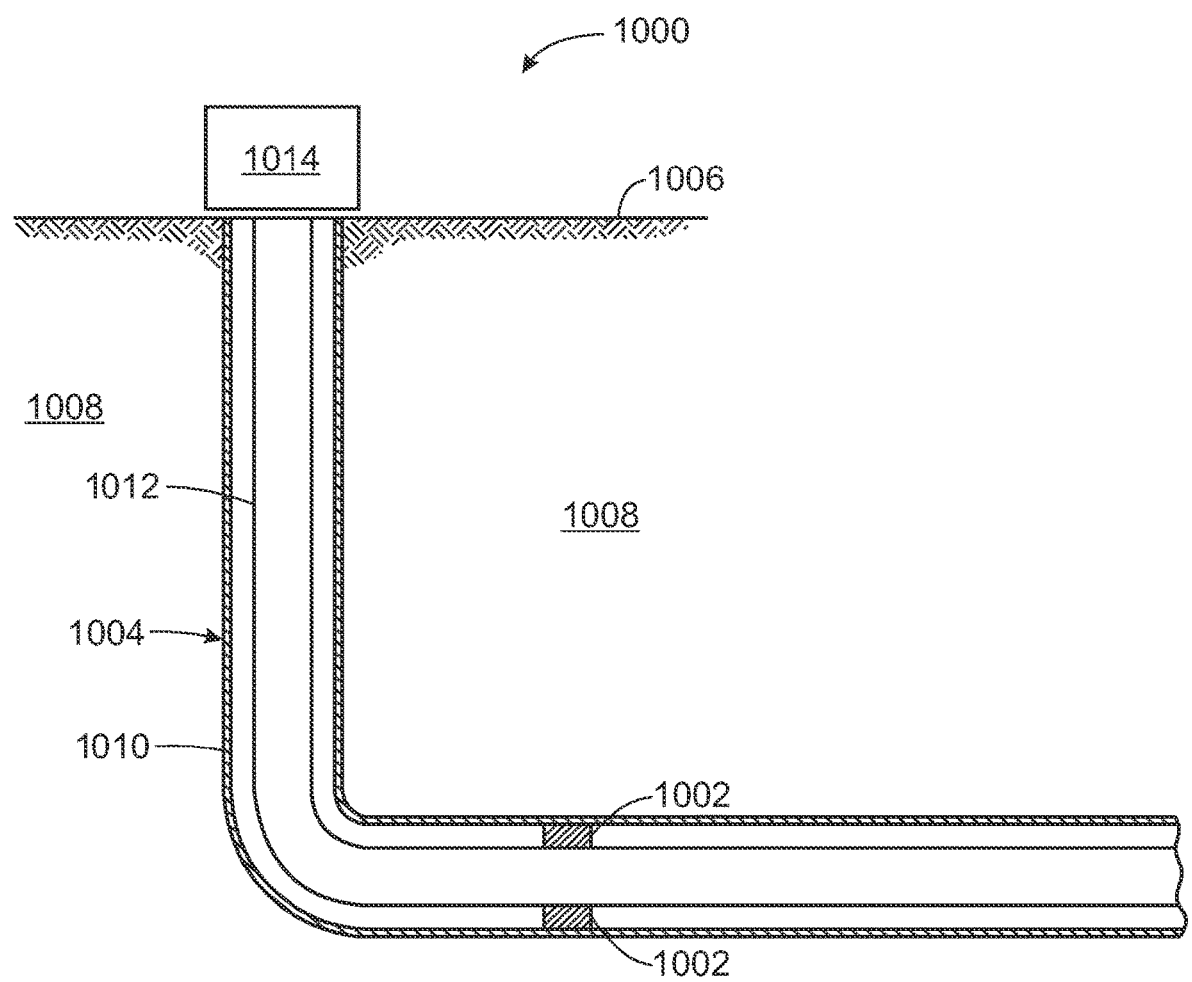
FIG. 10 is a diagram of a well site that includes a packer in a wellbore.

FIG. 8 is a thermoplastic fiber-reinforced composite that is a hollow profile 800 (as a representation of a packer mandrel or pressure housing) for downhole in a borehole (e.g., wellbore 1004 of FIG. 10). The hollow profile 800 is a structure having a wall 802 and an interior cavity 804. The interior cavity 804 is an internal space (volume) consistent with the profile being hollow. The hollow profile 800 shape may enclose the interior cavity 804 (internal space) as a void. In the illustrated implementation, the interior cavity 804 is enclosed by the wall 802 in the radial direction, but open at the longitudinal ends of the hollow profile 800. The inside surface of the wall 802 defines the interior cavity 804. The outside surface of the wall 802 is the exterior surface 806 of the hollow profile 800.

The hollow profile 800 may have a radial cross section that is circular (as depicted), square, rectangular, irregular, and so forth. A radial cross section is with the cutting plane (for the cross-section view) parallel to the radial axis and perpendicular to the longitudinal axis. The hollow profile 800 may be cylindrical (as depicted) with a circular radial cross section, or approximating cylindrical with a radial cross section that is generally or substantially circular. The wall thickness of the wall 802 can vary along the longitudinal length of the hollow profile 800, depending on the implementation. In examples, the hollow profile 800 as generally depicted can be, for instance, a downhole pressure housing, and the like. The hollow profile 800 can be a component (e.g., mandrel, etc.) of a downhole tool (e.g., packer), though may have a varying wall 802 thickness, not be as closely cylindrical, have step changes in the profile (exterior and interior), have irregular portions, and so on.

As mentioned, the hollow profile 800 is a composite of thermoplastic and reinforcement fibers. The thermoplastic is a matrix or a binder material in the composite. The fibers can be wound in directions (winding angles, fiber orientation) so that the hollow profile 800 favors hoops strength over axial strength. The hollow profile 800 may be formed by filament winding, bladder molding, tape placement, autoclave molding, and so on, to manufacture the packer mandrel or downhole pressure housing.

The increased hoop strength may provide collapse strength that resists collapse caused by pressure exerted on the exterior surface 806 of the hollow profile 800 in the wellbore. The increased hoop strength may provide burst strength that resists burst (rupture) of cause by interior pressure exerted on the wall 802 from the interior cavity 804.

Some example criteria of fibers with different thermoplastic matrices to manufacture a composite mandrel or pressure housing are given below. The combinations could be further tailored to meet specific design requirements of a packer mandrel or pressure housing using different combinations of fibers and the winding angles, as discussed above. For a first criterion, a majority of or all thick ply layers (>150 gsm) can be carbon, glass, aramid or thermoplastic fibers, and equivalent. These can be used as individual fiber or combination of fiber in through the thickness direction. In a second criterion, a majority of or all thin ply layers (<150 gsm) can be carbon, glass, aramid, or thermoplastic fibers, and equivalent. These can be used as individual fiber or combination of fiber in through the thickness direction. In a second criterion, outside-portion thin ply layers (<150 gsm) can be carbon, glass, aramid, or thermoplastic fiber layers, and interior thick ply layers (<150 gsm) can be carbon, glass, aramid, or thermoplastic fiber layers in through the thickness direction. In a fourth criterion, thin ply layers (<150 gsm) can be carbon, glass, Kevlar or thermoplastic fibers selectively used in a particular section of the mandrel (or pressure housing) along the longitudinal direction that benefits from selective strengthening.

As discussed, embodiments utilize a thermoplastic composite as a mandrel (that can act as a flow tube) in a packer assembly. The mandrel or flow tube of the packer (or of a packer assembly) is generally not under axial load in implementations and generally primarily (or only) experiences burst pressure and/or collapse pressure. Thus, the present techniques may orient the fibers for pressure (pressure causing hoop stress) rather than for axial tension or axial compression. Some aspects are directed to downhole equipment (e.g., downhole tool mandrels, downhole pressure housings, etc.) that are a composite of thermoplastic reinforced with fibers in which the fiber placement (orientation, winding angles) favors hoop strength over axial strength. Such can give increased collapse strength and increased burst strength compared to metallic counterparts of the downhole equipment. Other benefits for downhole tools of the present thermoplastic composites compared to conventionally utilized metals can include less corrosion and less friction.

Table 2 is a performance comparison with respect to strength, low friction, and corrosion resistance for (a) composites of epoxy reinforced with carbon, (b) steel, and (c) present composite of thermoplastic reinforced with carbon.

TABLE 2

Performance comparison of steel mandrel, thermosetting epoxy composite mandrel, and present thermoplastic composite mandrel

| | Strength (Increased collapse strength) | Low Friction (Reduced setting force) | Corrosion resistance |
|---|---|---|---|
| Carbon/epoxy composite | 3 | 3 | 1 |
| Steel | 3 | 2 | 3 |
| Present carbon/thermoplastic composite | 5 | 4 | 5 |

5—Excellent,
4—Very Good,
3—Good,
2—Fair,
1—Poor

Figure 9:
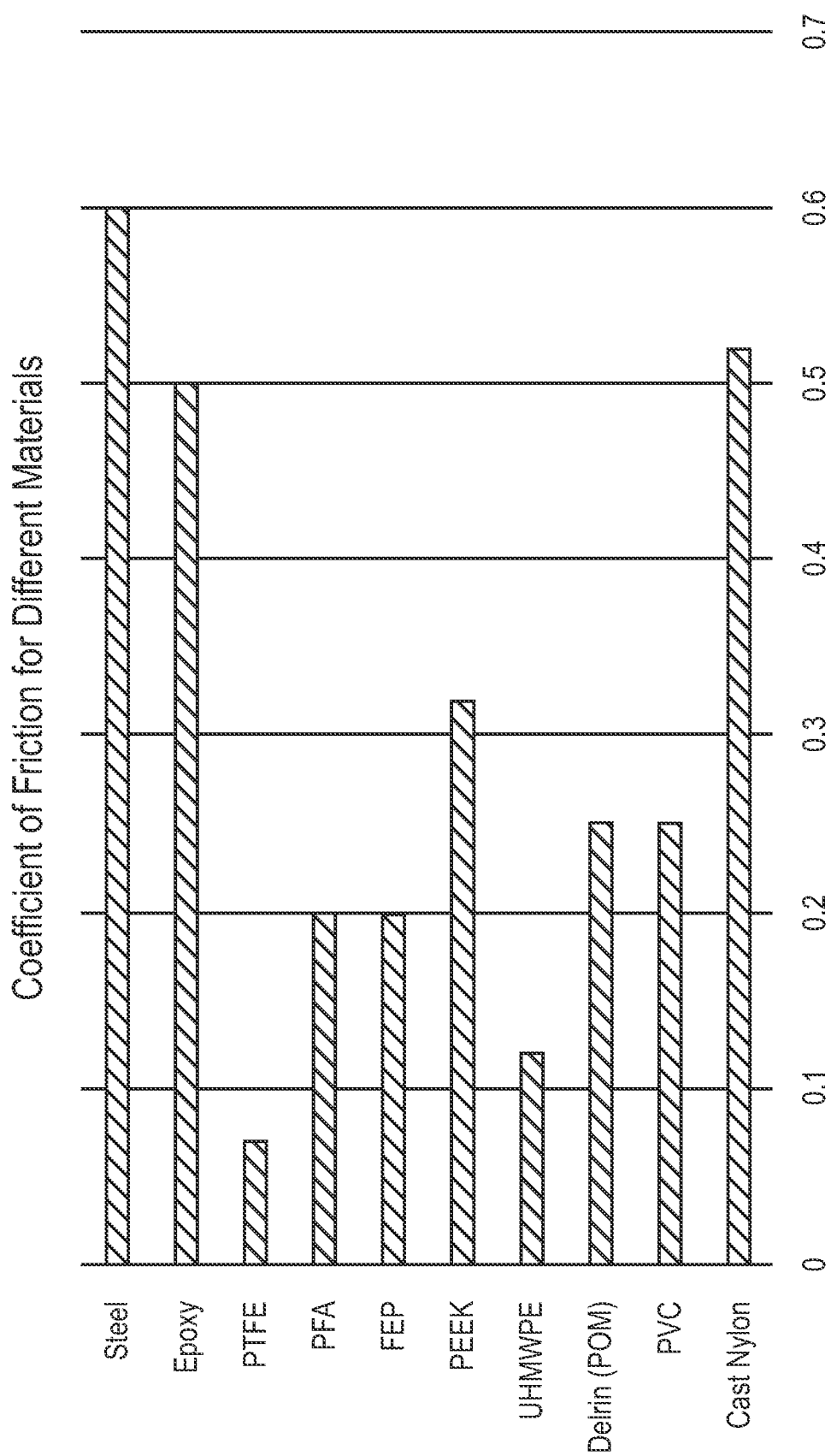
FIG. 9 is a bar chart for the coefficient of friction of different materials.

FIG. 9 is a bar chart for the coefficient of friction of different materials. The materials are depicted to the left. The numerical values for the coefficient of friction are depicted along the bottom of the bar chart. The materials given are steel, epoxy, PTFE, perfluoroalkoxy alkane (PFA) (a fluoropolymer), FEP fluorinated ethylene propylene (FEP) (a relatively tough, flexible copolymer of tetrafluoroethylene and hexafluoropropylene), PEEK, ultra-high molecular weight polyethylene (UHMWPE), acetal homopolymer polyoxymethylene (POM) (Delrin®), PVC, and cast nylon.

The composite mandrel can be manufactured with the fibers yarns or tapes that are pre-mixed or post-mixed with different fillers, such as carbon black, graphite, glass, silica, pigment, carbon nanotubes, graphene nanotubes, boron fillers, and/or boron nano powder, and the like, to improve the mechanical, chemical, flowability, conductivity, and other attributes. Plasma treatment, sandblasting, tailored grooves on the mandrel and other methodologies can be implemented to improve (increase) the adhesion between the metallic liners and the composite layers utilizing filament winding.

FIG. 10 is a well site 1000 that includes a packer 1002 in a wellbore 1004. The packer 1002 has a mandrel that is a composite of thermoplastic reinforced with fibers, as discussed. A pressure housing that is a composite of thermoplastic reinforced with fibers, as discussed, may also be situated downhole in the wellbore 1004. For the packer 1002 (and the pressure housing) as installed and operated in the wellbore 1004, the axial stress (axial load) experienced is less than 10% (e.g., in the range of 0% to 10%) of the hoop stress (hoop load) experienced. Therefore, the fiber placement (fiber orientation, winding angles) in the composite favors hoop strength over axial strength. In implementations, this means the composite is formed (e.g., via filament winding, etc.) with fiber winding angles that are beneficial for (or advance or increase) hoop strength without concern for axial strength. Thus, a downhole tool mandrel or pressure housing are a composite of thermoplastic resin (matrix) and fibers in which the fiber winding angle(s) are prioritized to give hoop strength over axial strength. A conflict between hoop strength and axial load is resolved by specifying a winding angle that increases hoop strength and decreases axial strength.

The wellbore 1004 is formed through the Earth surface 1006 into a subterranean formation 1008 in the Earth crust. In the illustrated implementation, the wellbore 1004 has a casing 1010 and is therefore a cased wellbore. Cement (not shown) may be disposed between the casing 1010 and the formation 1008 face. The formation 1008 face can be considered a wall of the wellbore 1004.

Perforations may be formed through the casing 1010 (and cement) for entry of fluid (e.g., hydrocarbon, water, etc.) from the subterranean formation 1008 into the wellbore 1004 to be produced (routed) as produced fluid through production tubing 1012 to the surface 1006. The surface equipment 1014 may include a wellhead for receipt of the produced fluid. In other implementations, the wellbore 1004 can be utilized for injection of fluid from the surface 1006 through the wellbore 1004 and the perforations in the casing 1010 (and cement) into the subterranean formation 1008.

The surface equipment 1014 can include a hoisting apparatus (e.g., for raising and lowering pipe strings) and a derrick. The surface equipment 1014 and equipment deployed in the wellbore 1004 can include equipment, such as a wireline, slickline, coiled tubing, tubing string, pipe, drill pipe, drill string, and the like, that facilitates mechanical conveyance for deploying downhole tools (e.g., packer 1002 and other tools). The deploying of the downhole tool (e.g., packer 1002) may include lowering the downhole tool into the wellbore 1004 from the surface 1006 and setting (e.g., via mechanical slips) the downhole tool in the wellbore 1004. In some implementations for the downhole tool as a packer 1002, the equipment (e.g., wireline) may provide electrical connectivity, for example, to actuate the packer 1002 to seal off a portion of the wellbore 1004.

Again, the casing 1010 may be secured within wellbore 1004 by cement (not shown). The casing 1010 may be, for example, metal, plastic, composites, and the like, and may be expanded or unexpanded as part of an installation procedure. Additionally, in implementations, the casing 1010 is not cemented into the wellbore 1004. The production tubing 1012 may be a tubing string utilized in the production of hydrocarbons. The packer 1002 may be disposed on or near production tubing 1012.

Depending on the type of packer 1002, the packer 1002 may be permanently set or retrievable, mechanically set, hydraulically set, and/or combinations thereof. The packer 102 may include one or more sealing elements (e.g., expandable seal elements). The packer 1002 may be set downhole to seal off a portion of wellbore 1004. When set, packer 1002 may isolate zones of the annulus between casing 1010 and the production tubing 1012 (e.g., a tubing string) by providing a seal (fluid seal) between the production tubing 1012 and the casing 1010 or liner (not shown) In examples, the packer 1002 may be disposed on the production tubing 1012. The packer 1002 may provide the seal between the packer 1002 and an adjacent surface, such as the casing 1010 (or liner).

It should be understood by those skilled in the art that present implementations are equally well suited for use in wellbores having other directional configurations including vertical wellbore, horizontal wellbores, deviated wellbores, multilateral wells and the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well. Also, even though FIG. 10 depicts an onshore operation, it should be understood by those skilled in the art that the packer and its sealing elements of the present techniques is equally well suited for use in offshore operations. In addition, while FIG. 10 depicts use of the packer 1002 in a cased portion of wellbore 1004, it should be understood that a packer 1002 may also be used in uncased portions (e.g., openhole portions) of the wellbore 1004.

In view of the foregoing, the present disclosure may downhole equipment (e.g., downhole tool mandrels, downhole pressure housings, etc.) that are a composite of thermoplastic reinforced with fibers in which the fiber placement (orientation, winding angles) favors hoop strength over axial strength. The methods, systems, and tools may include any of the various features disclosed herein, including one or more of the following statements.

Statement 1. An apparatus comprising a downhole tool for use in a borehole, the downhole tool comprising a composite of thermoplastic and fibers, wherein the fibers reinforce the thermoplastic, wherein the composite favors hoop strength over axial strength, wherein winding angles of the fibers give the composite as favoring the hoop strength over the axial strength, and wherein the downhole tool has a mandrel comprising the composite or wherein the downhole tool is a pressure housing.

Statement 2. The apparatus of Statement 1, wherein the downhole tool is a packer having the mandrel.

Statement 3. The apparatus of Statement 1, wherein the downhole tool is the pressure housing.

Statement 4. The apparatus of any preceding Statement, wherein the winding angles are in a range of 80° to 90° for an outer radial portion of the composite and in a range of 35° to 60° for an inner radial portion of the composite.

Statement 5. The apparatus of any preceding Statement, wherein the hoop strength is greater than the axial strength.

Statement 6. The apparatus of any preceding Statement, wherein the downhole tool is configured for no axial load.

Statement 7. The apparatus of any preceding Statement, wherein the thermoplastic comprises polyether ether ketone (PEEK), polyether ketone ketone (PEKK), polyetherimide (PEI), polytetrafluoroethylene (PTFE), polyaryl ether ketone (PAEK), polyimide, polyamide, nylon, polyurethane, acrylonitrile butadiene styrene (ABS), polyethylene, polycarbonate, polyphenylene sulfide (PPS), or polyvinyl chloride (PVC), or any combinations thereof.

Statement 8. The apparatus of any preceding Statement, wherein the fibers comprise carbon fibers, glass fibers, aramid fibers, boron fibers, metal fibers, ceramic fibers, or thermoplastic fibers, or any combinations thereof.

Statement 9. The apparatus of any preceding Statement, wherein the thermoplastic comprises PEEK, PEEK, PEI, nylon, PAEK, or polyimide, or any combinations thereof, and wherein the downhole tool comprises a liner coupled to the composite.

Statement 10. An apparatus comprising a downhole tool for use in a borehole, the downhole tool comprising a composite of thermoplastic and fibers, wherein the fibers reinforce the thermoplastic, wherein the composite favors hoop strength over axial strength, wherein fiber orientation of the fibers in the composite give the composite as favoring the hoop strength over the axial strength, and wherein the downhole tool is a packer having a mandrel comprising the composite or wherein the downhole tool is a pressure housing.

Statement 11. The apparatus of Statement 10, wherein the fiber orientation comprises winding angles of the fibers in the composite, wherein the winding angles are in a range of 80° to 90° for an outer radial portion of the composite and in a range of 35° to 60° for an inner radial portion of the composite, wherein the outer radial portion comprises an outer layer of the composite, and wherein the inner radial portion comprises an inner layer of the composite.

Statement 12. The apparatus of Statement 10 or 11, wherein the thermoplastic comprises polyether ether ketone (PEEK), polyether ketone ketone (PEKK), polyetherimide (PEI), polytetrafluoroethylene (PTFE), polyaryl ether ketone (PAEK), polyimide, polyamide, nylon, polyurethane, acrylonitrile butadiene styrene (ABS), polyethylene, polycarbonate, polyphenylene sulfide (PPS), or polyvinyl chloride (PVC), or any combinations thereof, and wherein the composite is formed by filament winding or bladder molding.

Statement 13. The apparatus of any one of Statements 10-12, wherein the fibers comprise carbon fibers, glass fibers, aramid fibers, ceramic fibers, or boron fibers, or any combinations thereof.

Statement 14. The apparatus of any one of Statements 10-13, wherein the thermoplastic comprises PEEK, PEEK, or PEI, or any combinations thereof, and wherein the fibers comprise carbon fibers.

Statement 15. A method of deploying a downhole tool into a borehole, comprising lowering the downhole tool into the borehole, the downhole tool comprising a composite of thermoplastic and fibers, wherein the fibers reinforce the thermoplastic, wherein the composite favors hoop strength over axial strength, wherein winding angles of the fibers in the composite give the composite as favoring the hoop strength over the axial strength, and wherein the downhole tool is a packer having a mandrel comprising the composite or wherein the downhole tool is a pressure housing.

Statement 16. The method of Statement 15, wherein the downhole tool comprises the packer, and wherein the method comprises forming a seal in the borehole between the packer and an adjacent surface.

Statement 17. The method of Statement 16, wherein the adjacent surface comprises a liner or casing in the borehole.

Statement 18. The method of any one of Statements 15-17, wherein the thermoplastic comprises polyether ether ketone (PEEK), polyether ketone ketone (PEKK), polyetherimide (PEI), polytetrafluoroethylene (PTFE), polyaryl ether ketone (PAEK), polyimide, polyamide, nylon, polyurethane, acrylonitrile butadiene styrene (ABS), polyethylene, polycarbonate, polyphenylene sulfide (PPS), or polyvinyl chloride (PVC), or any combinations thereof.

Statement 19. The method of any one of Statements 15-18, wherein the fibers comprise carbon fibers, glass fibers, aramid fibers, boron fibers, metal fibers, ceramic fibers, or thermoplastic fibers, or any combinations thereof, and wherein the composite is formed by filament winding or bladder molding.

Statement 20. The method of any one of Statements 15-19, wherein axial stress experienced by the composite in the borehole is less than 10% of hoop stress experienced by the composite in the borehole.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. An apparatus comprising:
   a downhole tool for use in a borehole, the downhole tool comprising a composite of thermoplastic and fibers, wherein the fibers reinforce the thermoplastic, wherein the composite favors hoop strength over axial strength, wherein winding angles of the fibers give the composite as favoring the hoop strength over the axial strength, wherein the winding angles are greater in an outer radial portion of the composite than in an inner radial portion of the composite, wherein the composite is configured for an axial load less than 10% of hoop stress, and wherein the composite comprises threads; and
   wherein the downhole tool has a mandrel comprising the composite or wherein the downhole tool is a pressure housing.

2. The apparatus of claim 1, wherein the downhole tool is a packer having the mandrel.

3. The apparatus of claim 1, wherein the downhole tool is the pressure housing.

4. The apparatus of claim 1, wherein the winding angles are in a range of 80° to 90° for the outer radial portion of the composite and in a range of 35° to 60° for the inner radial portion of the composite.

5. The apparatus of claim 4, wherein the fibers comprise carbon fibers, glass fibers, aramid fibers, boron fibers, metal fibers, ceramic fibers, or thermoplastic fibers, or any combinations thereof, wherein the outer radial portion comprises an outer layer of the composite, and wherein the inner radial portion comprises an inner layer of the composite.

6. The apparatus of claim 4, wherein the thermoplastic comprises PEEK, PEKK, PEI, nylon, PAEK, or polyimide, or any combinations thereof, wherein the winding angles are varied in an axial direction in the inner radial portion, and wherein the downhole tool comprises a liner coupled to the composite.

7. The apparatus of claim 1, wherein the hoop strength is greater than the axial strength.

8. The apparatus of claim 1, wherein the fibers comprise thick ply fibers that are at least 150 grams per square meter (gsm) in the outer radial portion and thin ply fibers that are less than 150 gsm in the inner radial portion.

9. The apparatus of claim 1, wherein the thermoplastic comprises polyether ether ketone (PEEK), polyether ketone ketone (PEKK), polyetherimide (PEI), polytetrafluoroethylene (PTFE), polyaryl ether ketone (PAEK), polyimide, polyamide, nylon, polyurethane, acrylonitrile butadiene styrene (ABS), polyethylene, polycarbonate, polyphenylene sulfide (PPS), or polyvinyl chloride (PVC), or any combinations thereof, and wherein the fibers comprise comingled fibers comprising first fibers comprising a second thermoplastic and second fibers comprising carbon fibers, glass fibers, aramid fibers, ceramic fibers, or boron fibers, or any combinations thereof.

10. An apparatus comprising:
a downhole tool for use in a borehole, the downhole tool comprising a composite of thermoplastic and fibers, wherein the fibers reinforce the thermoplastic, wherein the composite favors hoop strength over axial strength, wherein fiber orientation of the fibers in the composite give the composite as favoring the hoop strength over the axial strength, wherein winding angles of the fibers are greater in an outer radial portion of the composite than in an inner radial portion of the composite, wherein the composite is configured for an axial load less than 10% of hoop stress, and wherein the composite comprises threads; and
wherein the downhole tool is a packer having a mandrel comprising the composite or wherein the downhole tool is a pressure housing.

11. The apparatus of claim 10, wherein the winding angles are in a range of 80° to 90° for the outer radial portion of the composite and in a range of 35° to 60° for the inner radial portion of the composite, wherein the winding angles are varied in an axial direction in the inner radial portion, wherein the outer radial portion comprises an outer layer of the composite, and wherein the inner radial portion comprises an inner layer of the composite.

12. The apparatus of claim 11, wherein the thermoplastic comprises PEEK, PEKK, or PEI, or any combinations thereof, and wherein the fibers comprise carbon fibers.

13. The apparatus of claim 10, wherein the thermoplastic comprises polyether ether ketone (PEEK), polyether ketone ketone (PEKK), polyetherimide (PEI), polytetrafluoroethylene (PTFE), polyaryl ether ketone (PAEK), polyimide, polyamide, nylon, polyurethane, acrylonitrile butadiene styrene (ABS), polyethylene, polycarbonate, polyphenylene sulfide (PPS), or polyvinyl chloride (PVC), or any combinations thereof, wherein the fibers comprise carbon fibers, glass fibers, aramid fibers, ceramic fibers, or boron fibers, or any combinations thereof, and wherein the composite is formed by filament winding or bladder molding.

14. The apparatus of claim 10, wherein the fibers comprise thick ply fibers that are at least 150 grams per square meter (gsm) in the outer radial portion and thin ply fibers that are less than 150 gsm in the inner radial portion, and wherein the fibers comprise comingled fibers comprising first fibers comprising a second thermoplastic and second fibers comprising carbon fibers, glass fibers, aramid fibers, ceramic fibers, or boron fibers, or any combinations thereof.

15. A method of deploying a downhole tool into a borehole, comprising:
lowering the downhole tool into the borehole, the downhole tool comprising a composite of thermoplastic and fibers, wherein the fibers reinforce the thermoplastic, wherein the composite favors hoop strength over axial strength, wherein winding angles of the fibers in the composite give the composite as favoring the hoop strength over the axial strength, wherein the winding angles are greater in an outer radial portion of the composite than in an inner radial portion of the composite, wherein the composite comprises threads, and wherein axial stress experienced by the composite in the borehole is less than 10% of hoop stress experienced by the composite in the borehole; and
wherein the downhole tool is a packer having a mandrel comprising the composite or wherein the downhole tool is a pressure housing.

16. The method of claim 15, wherein the downhole tool comprises the packer, and wherein the method comprises forming a seal in the borehole between the packer and an adjacent surface comprising a liner or casing in the borehole.

17. The method of claim 15, wherein the winding angles are in a range of 80° to 90° in the outer radial portion and in a range of 35° to 60° in the inner radial portion, wherein the outer radial portion comprises an outer layer of the composite, and wherein the inner radial portion comprises an inner layer of the composite.

18. The method of claim 15, wherein the thermoplastic comprises polyether ether ketone (PEEK), polyether ketone ketone (PEKK), polyetherimide (PEI), polytetrafluoroethylene (PTFE), polyaryl ether ketone (PAEK), polyimide, polyamide, nylon, polyurethane, acrylonitrile butadiene styrene (ABS), polyethylene, polycarbonate, polyphenylene sulfide (PPS), or polyvinyl chloride (PVC), or any combinations thereof, and wherein the fibers comprise carbon fibers, glass fibers, aramid fibers, boron fibers, metal fibers, ceramic fibers, or thermoplastic fibers, or any combinations thereof.

19. The method of claim 15, wherein the fibers comprise comingled fibers comprising first fibers comprising a second thermoplastic and second fibers comprising carbon fibers, glass fibers, aramid fibers, boron fibers, metal fibers, ceramic fibers, or thermoplastic fibers, or any combinations thereof, and wherein the composite is formed by filament winding or bladder molding.

20. The method of claim 15, wherein the winding angles are varied in an axial direction in the inner radial portion.

* * * * *